(12) United States Patent
Sullivan

(10) Patent No.: US 10,182,402 B1
(45) Date of Patent: Jan. 15, 2019

(54) LOCATOR DEVICE WITH LOW POWER CONSUMPTION

(71) Applicant: GeoTraq Inc., Seattle, WA (US)

(72) Inventor: Gregg Sullivan, Seattle, WA (US)

(73) Assignee: GeoTraq Inc., Seattle, WA (US)

( * ) Notice: Subject to any disclaimer, the term of this patent is extended or adjusted under 35 U.S.C. 154(b) by 205 days.

(21) Appl. No.: 14/724,039

(22) Filed: May 28, 2015

Related U.S. Application Data

(60) Provisional application No. 62/003,623, filed on May 28, 2014.

(51) Int. Cl.
| | |
|---|---|
| H04W 4/00 | (2018.01) |
| H04W 52/02 | (2009.01) |
| H04W 4/14 | (2009.01) |
| H04W 4/021 | (2018.01) |
| G01S 5/02 | (2010.01) |

(52) U.S. Cl.
CPC ....... *H04W 52/0258* (2013.01); *G01S 5/0205* (2013.01); *H04W 4/021* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 6,859,654 | B1* | 2/2005 | Reynolds | H04W 24/00 455/437 |
| 7,595,724 | B2* | 9/2009 | Li | G01C 21/20 340/539.11 |
| 7,783,299 | B2* | 8/2010 | Anderson | G01S 5/0205 455/456.1 |
| 7,801,542 | B1* | 9/2010 | Stewart | G06Q 50/01 455/518 |
| 8,320,883 | B2* | 11/2012 | Watson | H04W 12/06 455/411 |
| 8,320,931 | B2* | 11/2012 | Ward | G01S 5/0205 455/456.1 |
| 8,554,180 | B2* | 10/2013 | Watson | H04W 12/06 455/411 |
| 8,787,171 | B2* | 7/2014 | Macnaughtan | G01S 5/0236 370/236 |
| 8,805,405 | B2* | 8/2014 | Cooper | H04W 4/02 455/456.1 |
| 9,188,451 | B2* | 11/2015 | Magnusson | G01C 21/30 |
| 2005/0085239 | A1* | 4/2005 | Cedervall | H04W 64/00 455/456.1 |
| 2011/0201364 | A1* | 8/2011 | Capuozzo | H04W 24/10 455/466 |
| 2015/0312863 | A1* | 10/2015 | Shen | G01S 19/34 455/574 |

* cited by examiner

Primary Examiner — Alpus Hsu
(74) Attorney, Agent, or Firm — FSP LLC

(57) ABSTRACT

An apparatus may include an interval timer; a power control; a subscriber identity module (SIM); an SMS packetizer; a geo-locator; an RF communicator; and logic to operate the interval timer cooperatively with the power control to cause a transition of the geo-locator from a sleep state to a wake state after a defined time interval, and to operate the geo-locator to receive signal levels and cell ids from a group of cellular base stations.

11 Claims, 9 Drawing Sheets

LOCATOR DEVICE WITH LOW POWER CONSUMPTION

CROSS-REFERENCE TO RELATED APPLICATIONS

This application claims priority under 35 U.S.C. 119 to U.S. application Ser. No. 62/003,623, filed on May 28, 2014, which is incorporated herein by reference in its entirety.

BACKGROUND

Conventional position location devices rely on technologies such as Global Positioning System (GPS) which involve continuous communications with a group of geo-synchronous satellites. These solutions are expensive in terms of power consumption. There is a long-felt need for devices that can track location of affixed objects to an acceptable degree of accuracy while maintaining long operational life in the field.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
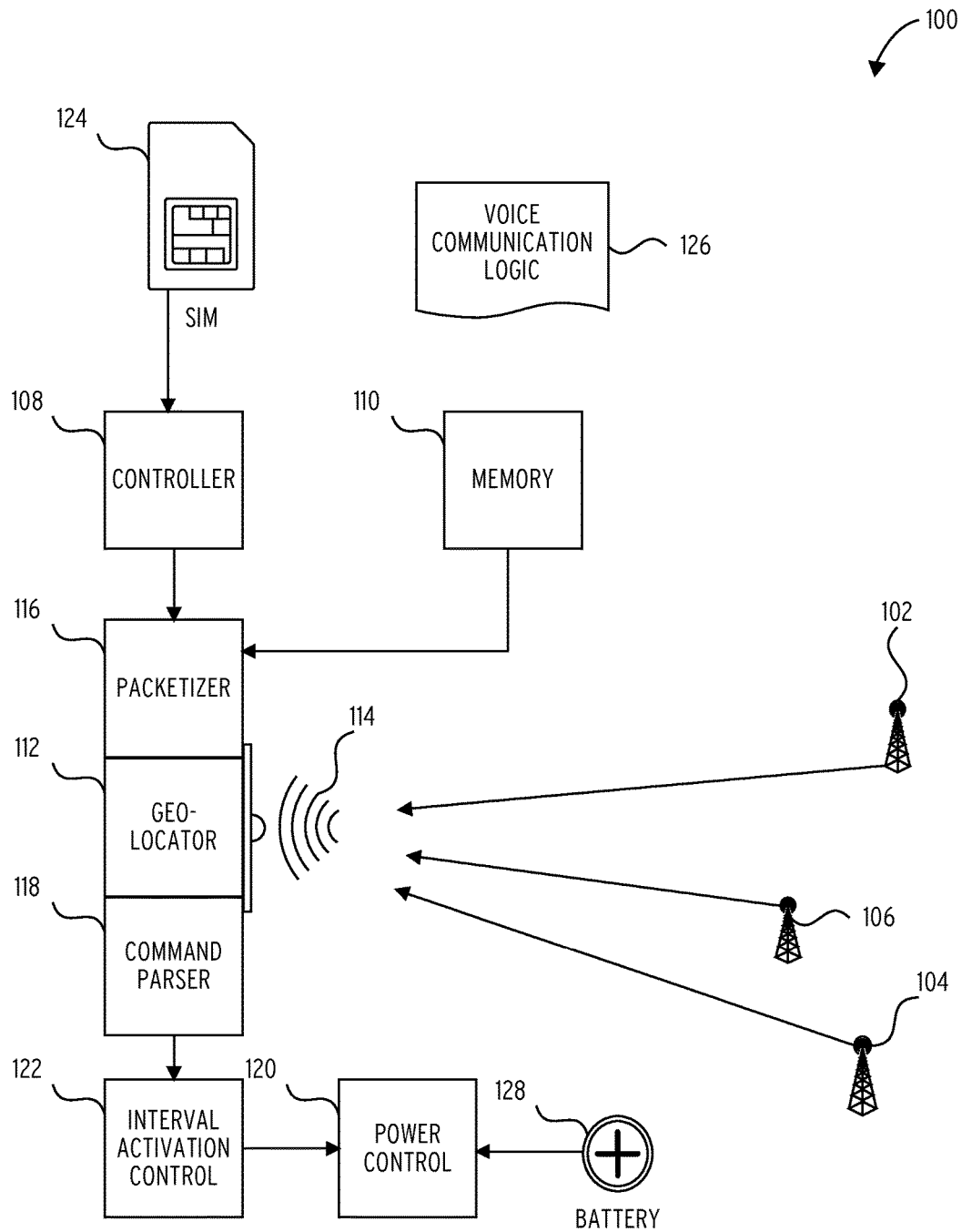
FIG. 1 illustrates an embodiment of a geo-location apparatus 100.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. "Logic" specifically excludes disembodied signals or software per se.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

(cell-ID, also referred to herein as 'cell id', cellular id', 'cell-ID', 'Cell-ID', and 'CID') in this context refers to a generally unique number used to identify each base transceiver station (BTS) or sector of a BTS within a location area code (LAC) if not within a GSM network. In some cases the last digit of CID represents cells' sector ID. Value 0 is used for omnidirectional antenna. Values 1,2,3 are used to identify sectors of trisector or bisector antennas.

(server) in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

(battery) in this context refers to a device comprising of one or more electrochemical cells (which may be referred to as 'stages') that convert stored chemical energy into electrical energy. In general, a battery is a chemical energy source. Rechargeable batteries are revitalized with a charger that usually needs to be plugged into a power source; such as, an electrical outlet or a car cigarette lighter for a recharge.

(antenna) in this context refers to a physical device that facilitates the transmission and reception of radio waves. Antennas are used in systems such as radio and television broadcasting, point-to-point radio communication, wireless LAN, mobile phones, radar, and spacecraft communication. Antennas come in a variety of shapes and sizes.

(controller) in this context refers to a logic component that performs data or signal processing to produce output signals applied to control the operation of one or more other logic components. The controlled component(s) may be internal to or external to the machine that is or includes the controller. A controller may form a link between two parts of a data processing device (for example a memory controller that manages access to memory for a computer) or a controller on an external device that manages the operation of (and connection with) that device.

(2G) in this context refers to (2nd generation) mobile telecommunications technology, the name usually given to original GSM, CDMA, and TDMA networks. 2nd-generation (2G) refers to the initial group of wireless technology standards that were digital instead of analog (1G).

(memory) in this context refers to a device having a machine interface and storing data in the form of an altered material/energy configuration. Two common types of device memory are SAM, or Sequential Access memory and RAM, or Random Access memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

(SIM) in this context refers to 'subscriber identity module', a removable logic component for mobile wireless devices. SIM cards store the required information to identify the mobile device. It may also include logic for voice encryption to make listening in on calls almost impossible (except when the wireless carrier itself is doing the eavesdropping). A customer ID (and personal number) is tied to the SIM card and not to a certain mobile device. This allows for a seamless interchange of the same SIM card between different devices, such as GSM mobile phones. SIM cards may also serve as storage for SMS messages and the user's contacts.

(RF) in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist. (Radio) can refer to anything related to radio signals, which are invisible electromagnetic waves created by applying a pulsing electric current to an antenna.

(timer) in this context refers to logic that measures elapsed time or a time interval (transceiver) in this context refers to a component that both transmits and receives. A transceiver is combination of a radio transmitter and receiver into one radio device or assembly.

In some embodiments, an apparatus may include an interval timer; a power control; a subscriber identity module (SIM); an SMS packetizer; a geo-locator; an RF communicator; and logic to operate the interval timer cooperatively with the power control to cause a transition of the geo-locator from a sleep state to a wake state after a defined time interval, and to operate the geo-locator to receive signal levels and cell ids from a group of cellular base stations.

In some embodiments, the apparatus operates the SMS packetizer to package the signal levels and the cell ids into an SMS message, and to communicate the SMS message using the RF communicator.

In some embodiments, such a apparatus may further include logic to block visibility to the SIM by the geo-locator for a limited duration after the transition.

In some embodiments, such a apparatus may further include logic to override a preset floor on the signal levels during the limited duration after the transition.

In some embodiments, such a apparatus may further include logic to associate the cell ids with the signal levels in a memory.

In some embodiments, such a apparatus may further include logic to receive a command SMS message via the RF communicator, a parser to extract a time interval command from the command SMS message, and/or logic to apply the time interval command to the interval timer to set the defined time interval.

In some embodiments, such a apparatus may further include logic to receive a response SMS message via the RF communicator, a parser to extract geo-locations for each of the cell ids from the response SMS message, and/or logic to associate the geo-locations for each of the cell ids with the cell ids in a memory.

One embodiment of a geo-location apparatus 100 includes a minimal component set to utilize Cell-ID to determine the device's location, with server-side enhancements to assist or refine the location determination. A typical device may include a mechanical housing, battery (or other power source), antenna, power management logic, controller logic, a cellular (e.g., 2G) transceiver, machine memory, and various ports or other data interfaces to external systems. The device may be configured using a SIM card (e.g., micro SIM).

The device may be adapted with logic to operate in various modes, with transitions limited to certain mode boundaries. Modes of operation may include deep sleep (all system components powered off except for a timer), wake up (activate transceiver, collect sensor data), survey (take level readings from proximate cell towers), communications (SMS communications over cellular network), and standby (monitor cellular command channel). A final mode in some embodiments is "end of life", in which the device completely shuts down operation and reinitializes.

The device may include power management logic and process optimizations to cycle from deep sleep through the various modes, back to deep sleep, in a minimal time. This further enhances field life and reduces power consumption. Security and data validation may be layered onto the SMS communications utilized by the device. For example, CRC (cyclic redundancy check) may be employed on SMS messages, as well as encryption.

The device may include a minimum set of components. Specifically, although utilized for location determination, the device specifically excludes any GPS location capability. The minimum set of included functionality comprises SMS capability but absent or deactivated voice communication capability. Another unusual feature is that the device is not normally operative, but instead is designed to automatically activate and report its location at infrequent intervals, for example, once per week or once per month. A unique minimum function set is defined and corresponding circuitry arranged to carry out this specific set of limited capability.

In one embodiment, the minimum device configuration includes NANO SIM card interface logic to receive operative information and to store data recorded from sensors, if any. The device configuration may further include a battery power source and an MCU (Master Control Unit), which is implemented as a programmable controller, microprocessor, or using other known technologies. The device further comprises machine memory including logic to broadcast over a cellular network, to collect information about the device's location by interacting with signals from nearby cellular towers and to determine RSSI levels for located nearby cellular towers. At least cellular id (CID) and RSSI information may be tracked or analyzed by the logic as operate the MCU and transmitted via SMS through the cellular network to a connected server device. The server device performs additional refined location for the device utilizing information in the SMS received from the device. It may communicate an SMS message to the device providing device wake up instructions, including a time interval for the device to the activate itself and communicate its location back to the server in the future. The server device may perform refined location processing for the device using a processed combining cell ID and RSSI levels for the proximate cellular towers.

Drawings

FIG. 1 illustrates an embodiment of a geo-location apparatus 100. The geo-location apparatus 100 comprises a controller 108, memory 110, SIM 124 (Subscriber Identity Module), geo-locator 112, packetizer 116, command parser 118, interval activation control 122, battery 128, and power control 120. The geo-location apparatus 100 interacts with multiple cellular base stations 102, 104, and 106 using the RF communicator 114. The number of cellular base stations illustrated is merely an example and not limiting.

The SIM 124 comprises a unique identifier for the owner/operator of the geo-location apparatus 100. This unique identifier (e.g., a phone number) may be utilized by the geo-location apparatus 100 in messages to and from the cellular base stations. The geo-location apparatus 100 may further comprise a unique device identifier encoded into the SIM 124 of the geo-location apparatus 100, for example an IMEI.

The RF communicator 114 may comprise a 2G RF transceiver and an antenna.

The power control 120 controls access to power from the battery 128, which components of the geo-location apparatus 100 are powered on, and the amount of power consumed by the geo-location apparatus 100 in various power modes (deep sleep, wake, etc.)

The memory 110 may be utilized to store data collected from the environment of the geo-location apparatus 100, for example from a sensor 204. Data in the memory 110 may be transformed into an SMS (Short Message Service) communication by the packetizer 116 for communication on a data RF channel to a cellular base station. SMS messages may also be received from a cellular base station and parsed (interpreted for commands and data) by the command parser 118.

The geo-location apparatus 100 may comprise voice communication logic 126 that is deactivated or disengaged from using the RF communicator 110.

Figure 2:
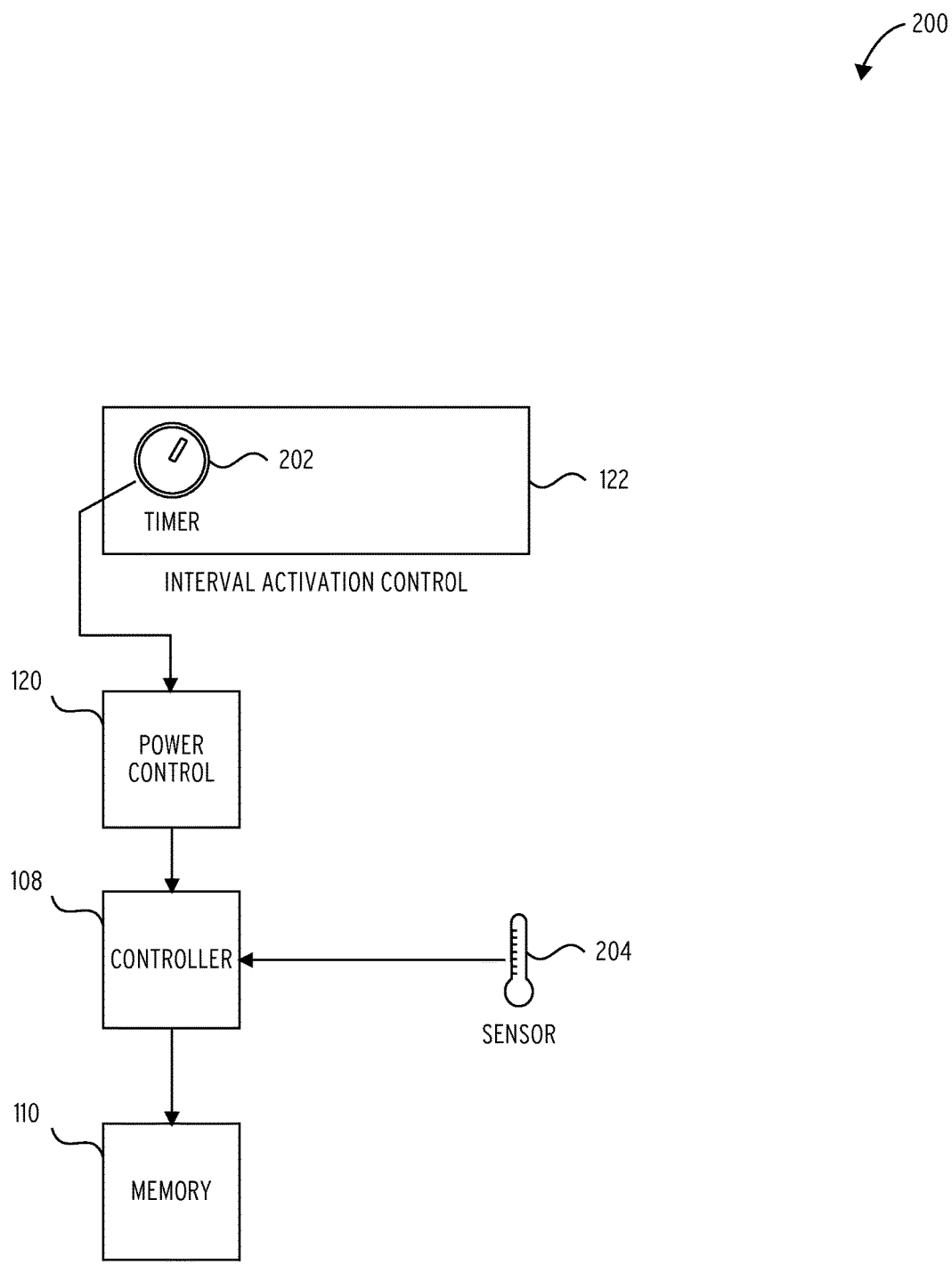
FIG. 2 illustrates an embodiment of an intermittent data acquisition assembly 200 of a geo-location apparatus 100.

FIG. 2 illustrates an embodiment of an intermittent data acquisition assembly 200 of a geo-location apparatus 100. The intermittent data acquisition assembly 200 comprises a sensor 204, controller 108, memory 110, power control 120, and interval activation control 122 which comprises a timer 202.

The interval activation control 122 is configured to alert the power control 120 when the timer 202 indicates that a configured time interval has elapsed. The time interval is typically periodic, but in some implementations may be non-periodic. 7

Figure 3:
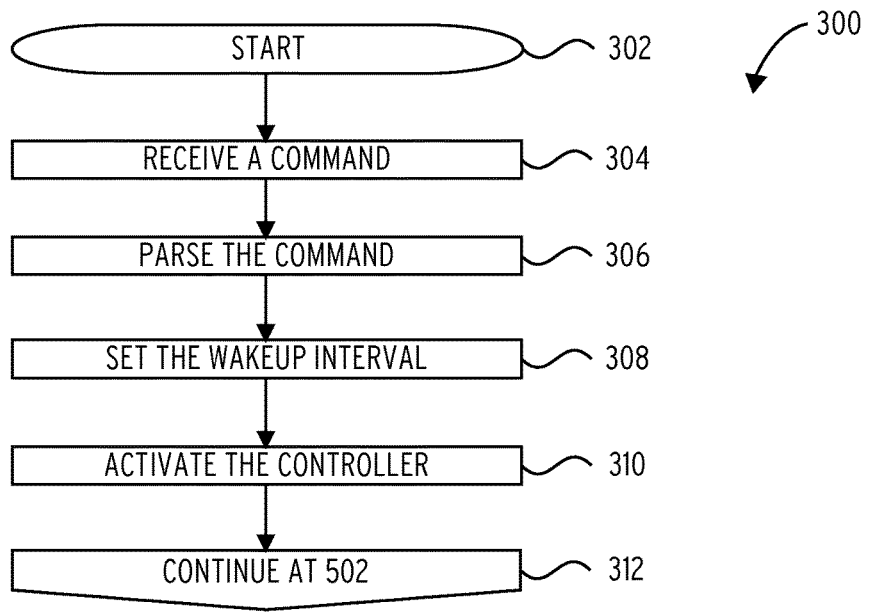
FIG. 3 illustrates an embodiment of a process 300 to configure the intermittent data acquisition assembly 200.

FIG. 3 illustrates an embodiment of a process 300 to configure the intermittent data acquisition assembly 200. The process 300 begins 302 at which point the intermittent data acquisition assembly 200 may receive a command (304), e.g. an SMS message, via the RF communicator 114. The intermittent data acquisition assembly 200 may parse the command (306), for example by operating the command parser 118. The command may comprise a time interval to configure the interval activation control 122. The interval activation control 122 may be configured with the time interval to set the wakeup interval (308).

The intermittent data acquisition assembly 200 may then activate the controller 108 (310) and the process 300 may continue to step 502 (312).

Figure 4:
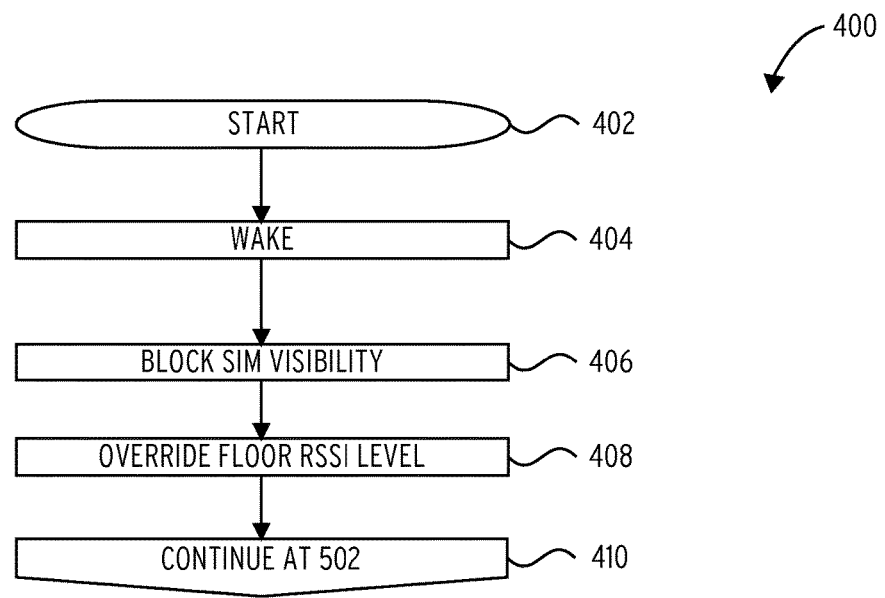
FIG. 4 illustrates an embodiment of a process 400 to wake a geo-location apparatus 100.

FIG. 4 illustrates an embodiment of a process 400 to wake a geo-location apparatus 100. After the start 402 the power control 120 increases or turns on power to components of the geo-location apparatus 100, such as the components illustrated in FIG. 1 and FIG. 2. This is referred to as performing a "wake" of these components (404). The visibility to the controller 108 of the SIM 124 may be blocked (406) during the early phases of the waking process 400. This means that the information stored on the SIM 124, such as a unique user id, is turned off and made unavailable during the early phase of the process 400. The geo-location apparatus 100 may also override floor RSSI levels (408) that the geo-locator 112 is configured to overlook or discard by default. RSSI is an acronym for Recieved Signal Strength Indicator, a measurement of the power present in a received radio (RF) signal. By doing this the geo-locator 112 may account for signals from all detected cellular base stations, not just those with stronger signals. The process 400 continues at 502 (410).

Figure 5:
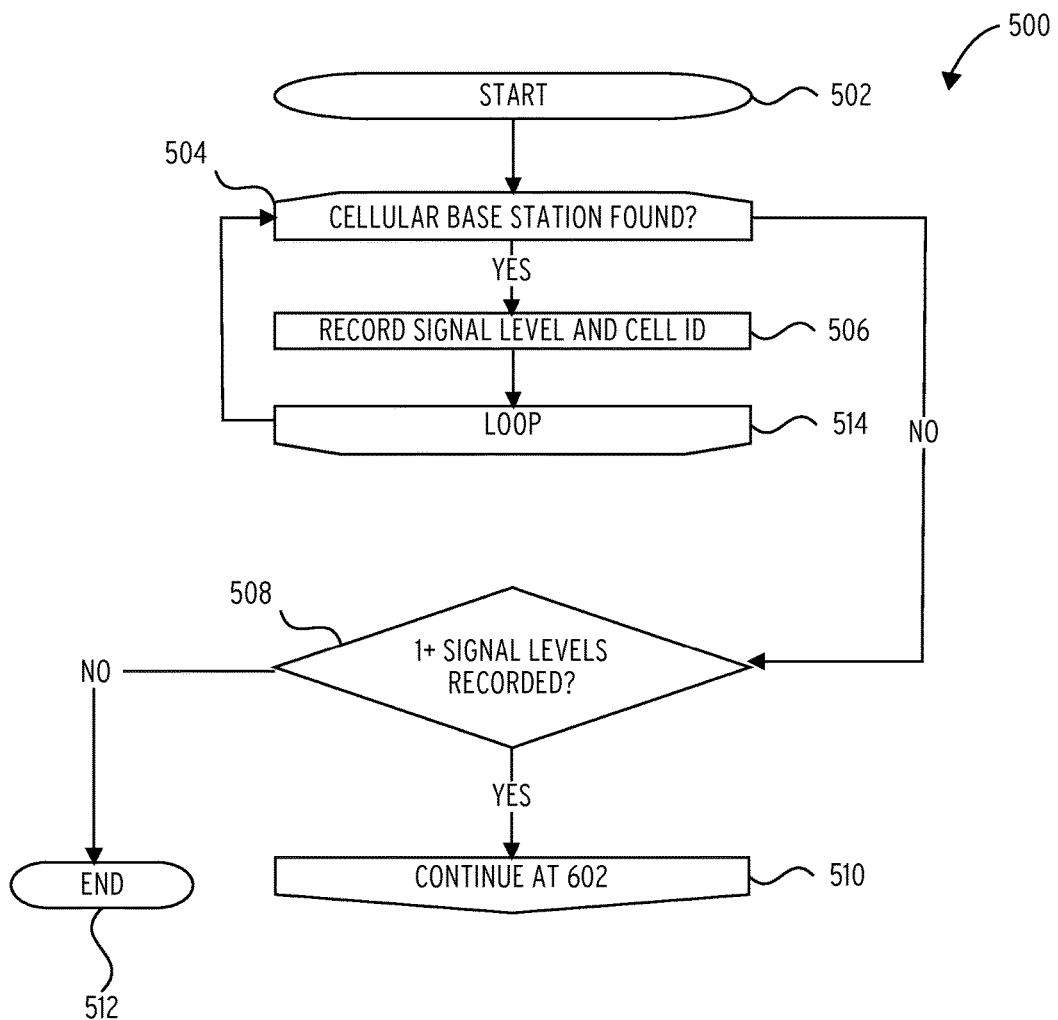
FIG. 5 illustrates an embodiment of a process 500 to collect and record RSSI signal levels from cellular towers detected by a geo-location apparatus 100.

FIG. 5 illustrates an embodiment of a process 500 to collect and record RSSI signal levels from cellular towers detected by a geo-location apparatus 100. The process 500 may typically be carried out by the controller 108 operating in conjunction with the RF communicator 114 and the memory 110.

The process 500 starts (502) and if a cellular base station is found (504) the RSSI signal level and corresponding cell id are recorded in memory 110 (506). The process 500 arrives at loop 514 then repeats at 504 until no more cellular base stations are found. If more than one signal level is recorded (508) the process 500 continues at 512. Otherwise the process continues at 510 to step 602 (FIG. 6).

Figure 6:
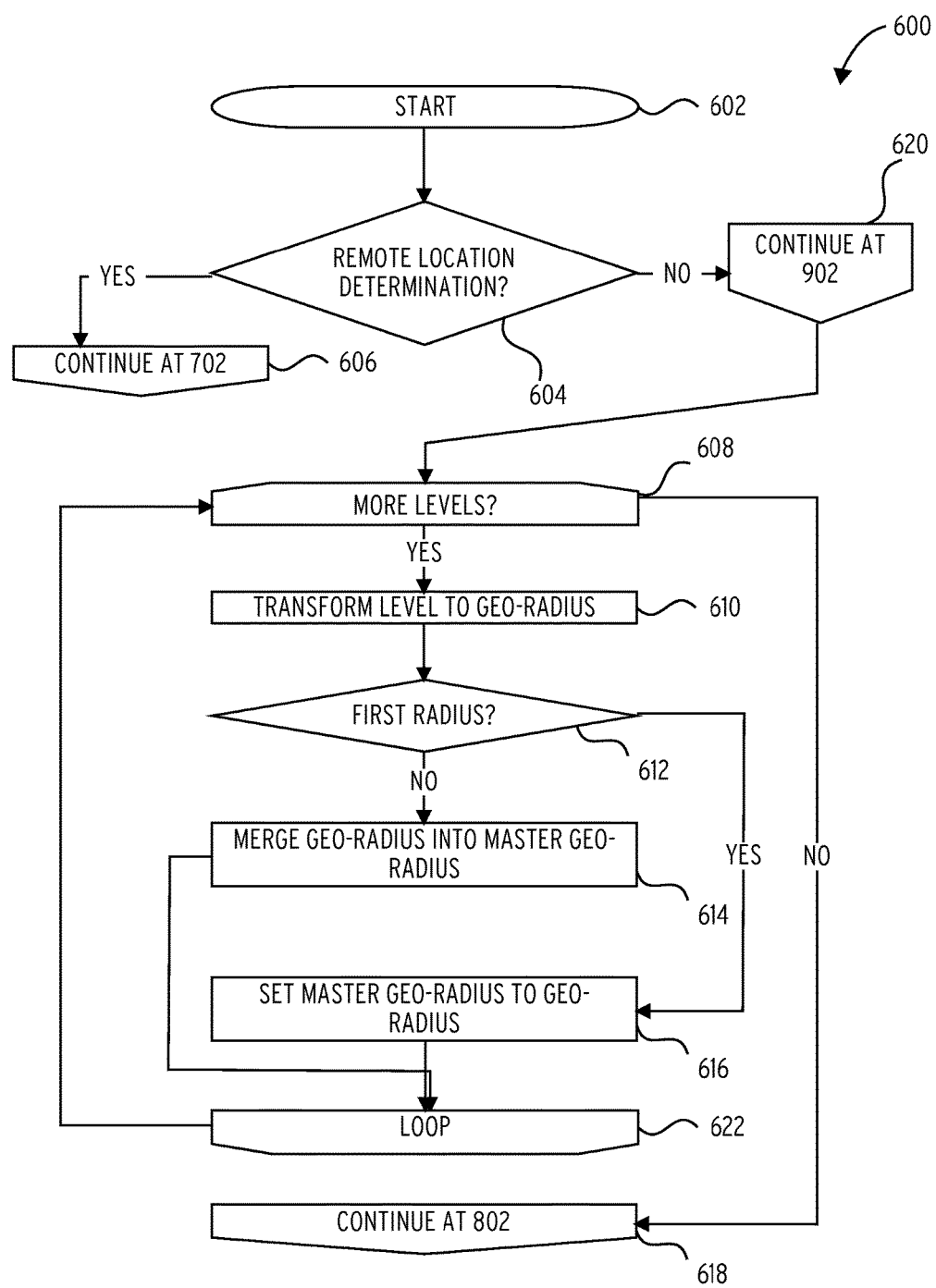
FIG. 6 illustrates an embodiment of a process 600 by which a geo-location apparatus 100 may determine a geo-boundary of its physical location.

FIG. 6 illustrates an embodiment of a process 600 by which a geo-location apparatus 100 may determine a geo-boundary of its physical location. These actions may typically be carried out by the geo-locator 112 operating the controller 108 in cooperation with the memory 110.

Figure 7:
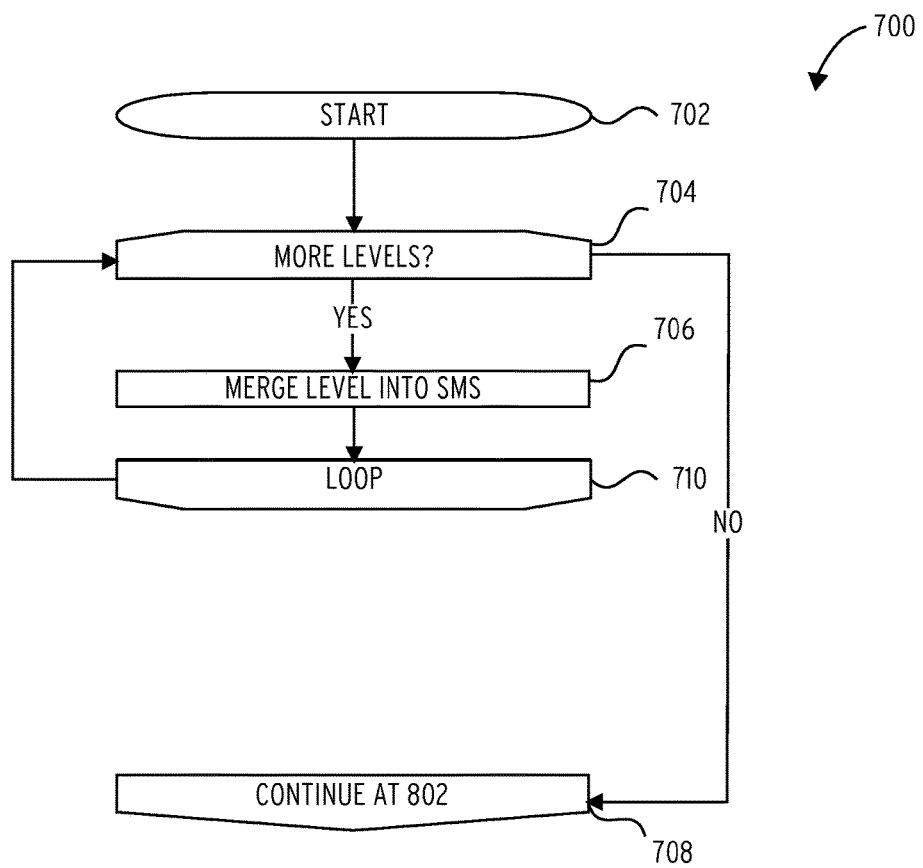
FIG. 7 illustrates an embodiment of a process 700 to transform RSSI levels into an SMS message to a remote server.

The process 600 starts 602 and if a remote location determination is to be carried out (604), the process 600 continues to step 702 in FIG. 7 (606). A remote location determination is a determination of the geo-boundary of the geo-location apparatus 100 by a remote (remotely located from the geo-location apparatus 100) server system. If the location is to be carried out by the geo-location apparatus 100 itself, the process 600 continues to step 902 in FIG. 9 (620), which identifies the geo-locations of the detected cellular base stations, and returns to continue at step 608.

Processing continues at 608 to determine if there are more RSSI levels that were detected and stored in the memory 110. If yes, the RSSI level is transformed to a geo-radius value (610) around the geo-location coordinates of the associated cellular base station (as identified by cellular id). If this is the first determined geo-radius (612), the master geo-radius is initialized to this first geo-radius (616). Otherwise, the geo-radius is merged into the already existing master geo-radius (614). "Merged" means that the master geo-radius is compared with the geo-radius and redefined according to an intersection area or point of the two. The process 600 arrives at LOOP 622 and repeats at 608 for each stored RSSI signal level, until there are no more, at which point processing continues with step 802 (618).

FIG. 7 illustrates an embodiment of a process 700 to transform RSSI levels into an SMS message to a remote server. The process 700 may typically be carried out by the packetizer 116 operating the controller 108 in cooperation with the memory 110.

The process 700 starts (702) and while there are more levels (704) the levels are merged into an SMS message (706) by the packetizer 116. The process 700 arrives at LOOP 710 and repeats at 704. When all levels are merged into the SMS message the process 700 continues at step 802 of FIG. 8 (708).

Figure 8:
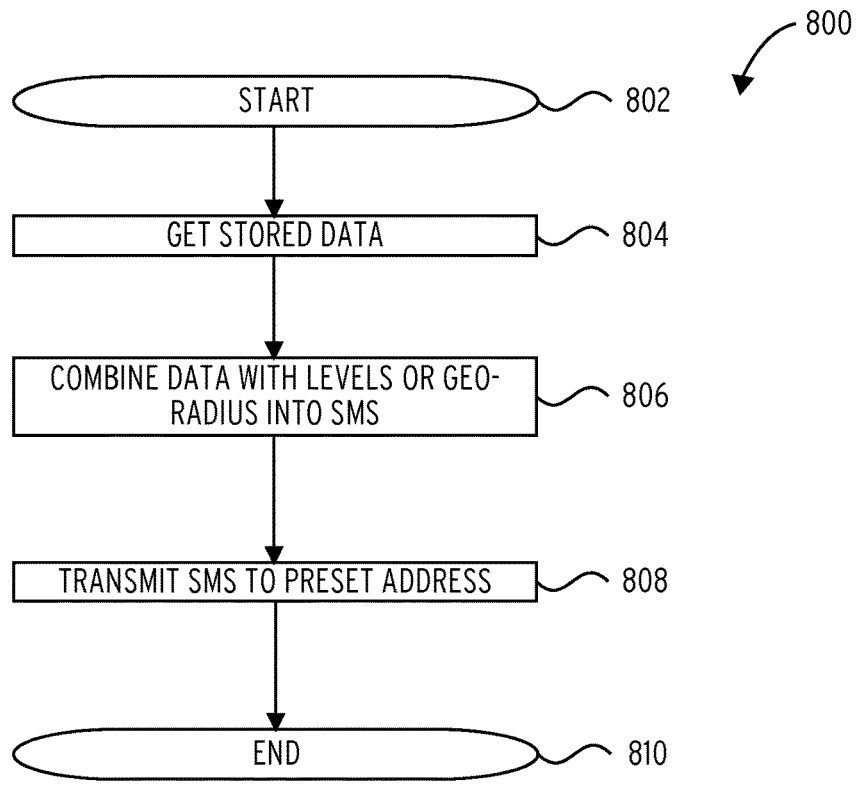
FIG. 8 illustrates an embodiment of a process 800 to burst data from a geo-location apparatus 100 during a wake interval.

FIG. 8 illustrates an embodiment of a process 800 to burst data from a geo-location apparatus 100 during a wake interval. After the start 802 the geo-location apparatus 100 retrieves data (804) stored in the memory 110, for example data representing a reading from the sensor 204. The data is combined (806) with RSSI levels or a geo-radius into an SMS message, for example using packetizer 116, and transmitted to a preset address (808) (e.g., a preset phone number stored in the memory 110 or SIM 124) using the RF communicator 114. The process then concludes (810).

Figure 9:
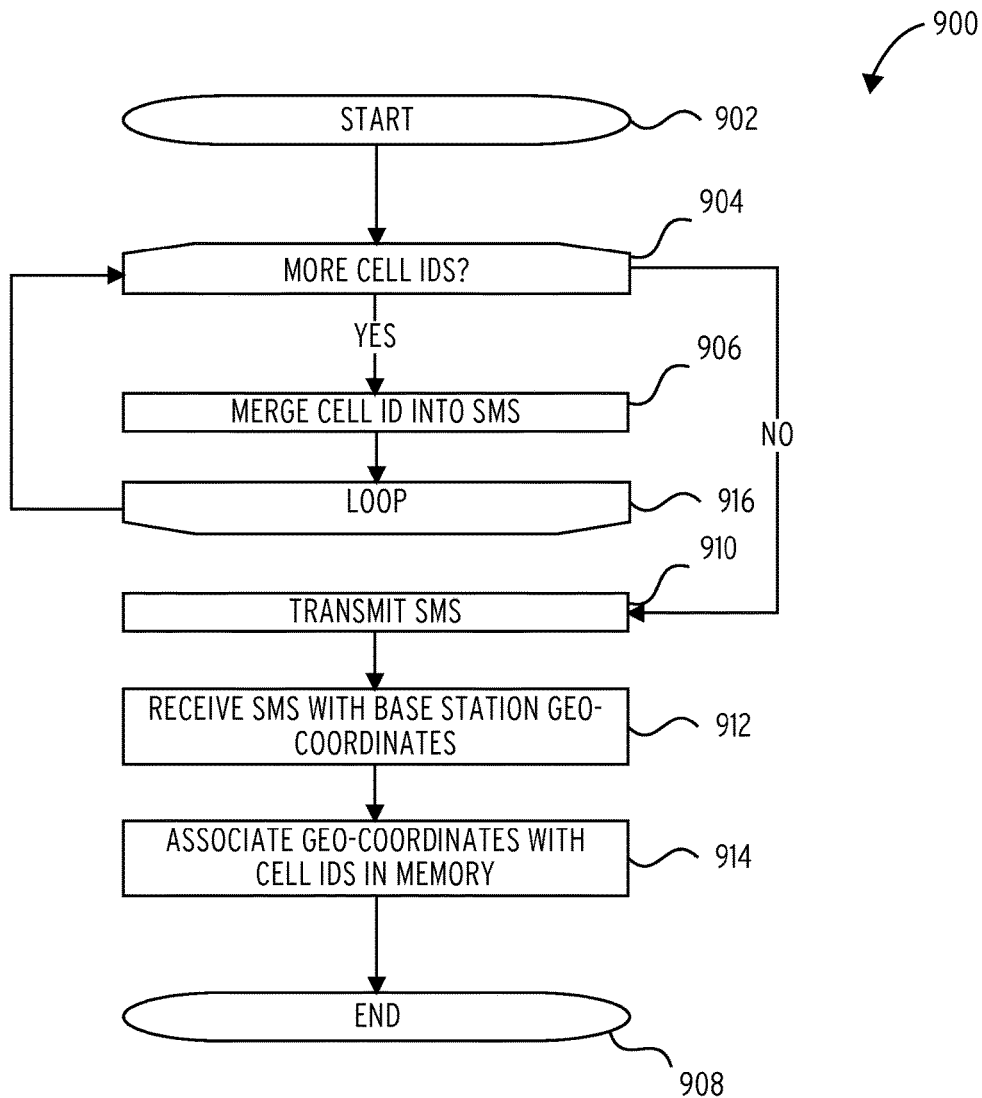
FIG. 9 illustrates an embodiment of a process 900 by which a geo-location apparatus 100 may identify cellular base station geo-coordinates.

FIG. 9 illustrates an embodiment of a process 900 by which a geo-location apparatus 100 may identify cellular base station geo-coordinates. This process 900 may be carried out by the controller 108 in cooperation with the memory 110 and RF communicator 114.

After the start 902, if there are more cell ids (904) that were received from base stations, the next cell id is merged into an SMS message (906). The process arrives at LOOP 916 and repeats at 904 until there are no more cell ids, and then the SMS is transmitted (910) using the RF communicator 114.

The cellular ids are extracted from the SMS by a server system to which the SMS message is directed (e.g., corresponding to the preset communication address in the memory 110 or the SIM 124). The server looks up geo-coordinates corresponding to each cellular id and packages the geo-coordinates into an SMS message that is then communicated back to the geo-location apparatus 100. The SMS message is received (912) by the geo-location apparatus 100 and the geo-coordinates are associated with their corresponding cellular ids in the memory 110 (914). The process 900 concludes at 908.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An apparatus comprising: an interval timer; a power control;
    a Short Message Service (SMS) packetizer;
    a geo-locator;
    a radio frequency (RF) communicator; and
    a controller and a memory, the memory comprising instructions for the controller to operate the interval timer cooperatively with the power control to cause a transition of the geo-locator from a sleep state to a wake state after a preset defined time interval, and to operate the geo-locator to receive signal strength levels and corresponding cell ids from a plurality of cellular base stations, and to operate the SMS packetizer to package the signal strength levels and the corresponding cell ids into a first outgoing SMS message, and to communicate the first outgoing SMS message to a preset address using the RF communicator.

2. The apparatus of claim 1, further comprising:
    a subscriber identity module (SIM); and
    the memory further comprising instructions to block visibility to the SIM by the geo-locator for a limited duration after the transition of the geo-locator from the sleep state to the wake state after the defined time interval.

3. The apparatus of claim 2, further comprising:
    the memory further comprising instructions to override a preset floor on the signal strength levels during the limited duration after the transition of the geo-locator from the sleep state to the wake state after the defined time interval.

4. The apparatus of claim 1, further comprising:
    the memory further comprising instructions to operate the SMS packetizer to package the signal strength levels with the corresponding cell ids.

5. The apparatus of claim 1, further comprising:
    the memory further comprising instructions to receive a command SMS message via the RF communicator;
    a parser to extract a time interval command from the received command SMS message; and
    the memory further comprising instructions to apply the time interval command to the interval timer to set the defined time interval.

6. The apparatus of claim 1, further comprising:
    the memory further comprising instructions to receive a response SMS message via the RF communicator, the response SMS message being a response to the first outgoing SMS message;
    a parser to extract geo-locations for cell ids from the response SMS message;
    and the memory further comprising instructions to associate the geo-locations for each of the cell ids from the response message with corresponding cell ids in the memory.

7. A method comprising:
    applying an interval timer to a power control to control power for a subscriber identify module (SIM), a Short Message Service (SMS) packetizer, a geo-locator, and a radio frequency (RF) communicator after a preset defined time interval;
    operating the interval timer cooperatively with the power control to cause a transition of the geo-locator from a sleep state to a wake state after the defined time interval;
    operating the geo-locator to receive signal strength levels and corresponding cell ids from a plurality of cellular base stations;
    operating the SMS packetizer to package the signal strength levels and the corresponding cell ids into an outgoing SMS message; and
    communicating the outgoing SMS message to a preset address using the RF communicator.

8. The method of claim 7, further comprising:
    blocking visibility to the SIM by the geo-locator for a limited duration after the transition.

9. The method of claim 8, further comprising:
    overriding a preset floor on the signal strength levels during the limited duration after the transition.

10. The method of claim 7, further comprising:
    receiving a command SMS message via the RF communicator;
    extracting a time interval command from the command SMS message; and
    applying the time interval command to the interval timer to set the defined time interval.

11. The method of claim 7, further comprising:
    receiving a response SMS message via the RF communicator in response to the outgoing SMS message;
    extracting geo-locations for cell ids from the response SMS message; and
    associating the geo-locations for each of the cell ids from the response SMS message with corresponding cell ids in a memory.

* * * * *